(12) United States Patent
Hackenberger et al.

(10) Patent No.: US 7,781,358 B2
(45) Date of Patent: Aug. 24, 2010

(54) ANTIFERROELECTRIC MULTILAYER CERAMIC CAPACITOR

(75) Inventors: Wesley S. Hackenberger, State College, PA (US); Seongtae Kwon, State College, PA (US)

(73) Assignee: TRS Technologies, Inc., State College, PA (US)

( * ) Notice: Subject to any disclaimer, the term of this patent is extended or adjusted under 35 U.S.C. 154(b) by 245 days.

(21) Appl. No.: 12/032,576

(22) Filed: Feb. 15, 2008

(65) Prior Publication Data

US 2009/0207555 A1   Aug. 20, 2009

(51) Int. Cl.
C04B 35/457 (2006.01)
C04B 35/491 (2006.01)
H01G 4/12 (2006.01)

(52) U.S. Cl. .......... 501/134; 501/135; 501/136; 501/137; 501/138; 501/139; 361/321.4; 264/615

(58) Field of Classification Search .......... 501/134, 501/135, 136, 137, 138, 139; 361/321.4; 264/615
See application file for complete search history.

(56) References Cited

U.S. PATENT DOCUMENTS

| | | | | |
|---|---|---|---|---|
| 3,670,211 A | * | 6/1972 | Kumada et al. | 361/311 |
| 5,858,451 A | * | 1/1999 | Boyle | 427/79 |
| 5,954,993 A | * | 9/1999 | Horikawa et al. | 252/62.9 PZ |
| 6,028,021 A | * | 2/2000 | Kim et al. | 501/135 |
| 6,096,672 A | * | 8/2000 | Kim et al. | 501/135 |
| 6,825,143 B2 | * | 11/2004 | Nada et al. | 501/134 |

FOREIGN PATENT DOCUMENTS

| | | | |
|---|---|---|---|
| DE | 1471065 | * | 5/1976 |
| JP | 75003517 | * | 2/1975 |
| JP | 63018698 | * | 1/1988 |
| JP | 10256495 | * | 9/1998 |
| JP | 11043371 | * | 2/1999 |
| JP | 11134941 | * | 5/1999 |

* cited by examiner

*Primary Examiner*—Karl E Group
(74) *Attorney, Agent, or Firm*—McNees Wallace & Nurick, LLC

(57) ABSTRACT

An antiferroelectric ceramic material that can be formed into a multilayer capacitor is disclosed. The antiferroelectric ceramic material is selected from the Pb(Sn, Zr, Ti)O3 (PSnZT) composition family.

15 Claims, 11 Drawing Sheets

ANTIFERROELECTRIC MULTILAYER CERAMIC CAPACITOR

FIELD OF THE INVENTION

The present invention is directed to ceramic capacitors, and more specifically to multilayer ceramic capacitors containing antiferroelectric material.

BACKGROUND OF THE INVENTION

Power electronics are becoming increasingly important to applications such as power distribution, transportation, spacecraft, medical devices, and weapons. Modern power electronics use solid state switching devices to convert AC to DC and to change voltages and waveforms. The electronics are most often computer programmable and can be used to rapidly change the type of power delivered in response to changing demands. On large and medium size transportation platforms such as ships, submarines, aircraft, and hybrid electric vehicles, electric drive systems are replacing direct mechanical linkages, such as drive shafts, resulting in highly efficient and adaptable propulsion systems. Advanced power electronics are also making it possible to reroute power on demand from electric motors to weapon systems or around damaged zones resulting in highly adaptable, fault tolerant mobile platforms. A common theme among all these systems is the need to reduce size and weight so that power conditioning modules of increasing capacity and functionality can be incorporated into a greater range of applications. Of all the components used to make power conditioning modules, capacitors usually take up the largest volume and often the greatest weight.

Capacitors are also a key component in pulsed power circuits used to deliver very large amounts of energy in a very short time. Pulsed power circuit applications include medical defibrillators, directed energy tools and weapons including lasers, RF, microwave and X-ray, detonators, electromagnetic armor and electromagnetic launchers. In all these systems, energy is stored in capacitor banks before being rapidly discharged into a circuit that performs a function. The main limitation to improving these systems either by delivering more energy or by reducing their size, particularly on mobile platforms, is the capacity and size of the energy storage capacitors.

For both power conditioning and pulse power applications, the amount of electrical energy per unit volume or weight, the energy density, that can be stored in the capacitor is a critical factor in determining the size of the power electronic system. The energy density is determined by the component's capacitance and maximum safe operating voltage. The greater a capacitor's energy density the more energy it can deliver to a circuit or the smaller the capacitor can be used to deliver the same energy relative to a lower energy density component.

Capacitors are characterized by the dielectric constant of the dielectric material used to store energy, their losses which generate heat on discharge, the voltage levels that can be applied to them, their operating temperature ranges, and the ranges of capacitance levels that can be achieved. At the most basic level, the structure of a capacitor consists of a slab of dielectric material between two electrically conducting plates. Applying a voltage across the plates causes energy to be stored in the dielectric material. The capacitance of the capacitor is determined by $$C = \frac{k\varepsilon_0 A}{t} \quad (1)$$

Where C is the capacitance in Farads, k is the relative permittivity (dielectric constant) of the dielectric material, $\varepsilon_0$ is the permittivity of free space ($8.854\times10^{-12}$ F/m), A is the area of dielectric covered by the conducting plates, and t is the thickness of the dielectric. The energy stored in the dielectric is $$U = \int_0^E E\,dP = \varepsilon_0 \int_0^E E\varepsilon(E)\,dE \quad (2)$$

Where U is the stored energy in Joules, E is the electric field applied to the dielectric, dP is the change in polarization induced in the dielectric by the applied field and $\varepsilon(E)$ is the electric field dependent permittivity ($k(E)=\varepsilon(E)/\varepsilon_0$). For most dielectrics the permittivity and dielectric constant are not field dependent, therefore, the stored energy reduces to $$U = \frac{1}{2}\varepsilon\varepsilon_0 E^2 \quad (3)$$

Or for a capacitor $$U = \frac{1}{2}CV^2 \quad (4)$$

Therefore, as can be seen by these relationships, more energy is stored in a dielectric with a high permittivity (high k), in a capacitor with a high capacitance (high C), and in a dielectric or capacitor that has a high breakdown strength allowing the application of high E or V. The various capacitor technologies have differing fabrication methods and differing quality of dielectric and connecting electrodes. Capacitors that can be made with thin, high quality dielectric and low resistivity electrodes can be operated with a high electric field across the dielectric resulting in high voltage and therefore high energy density. Capacitors with low loss dielectric and low resistivity conductors can be discharged very quickly and can operate continuously at high frequency and high power.

Polymer and paper capacitors are made with dielectrics that have a low dielectric constant (k), on the order of approximately 2 to 4, but a very high breakdown strength. High energy density is thus achieved in these capacitors by operating them at high voltage (high electric field across the polymer). The capacitors are made by rolling sheets of dielectric with metal foils between them to serve as electrodes or rolling sheets that have been coated with a thin film of metal. The sheets can be made very thin and can be rolled into large capacitors (100's µF). Polymers also exhibit low dielectric losses. As such they are the state-of-the-art for both power conditioning and pulse power applications. Pulsed power polymer capacitors have energy densities approaching 2 J/cm³. They can also be made to fail gracefully instead of catastrophically. However, they have low melting temperatures so they cannot usually be used much higher than 100° C. Also for power conditioning applications, where the capacitors are subjected to high frequency signals for long periods of time, the operating voltages must be significantly derated from what would be used in pulse power applications. Therefore, the effective energy density of polymer (and paper) capacitors in power conditioning applications is only 0.2 to as low as 0.02 J/cm$^3$.

Higher energy densities are needed to reduce the size of polymer capacitors in both power conditioning and pulse power circuits. However, the quality of current polymer films is very high, and there are few areas of polymer capacitor manufacturing technology that can be improved to further increase breakdown strength. There have been many recent attempts to improve polymers by increasing dielectric constant, but this often results in reduced temperature ranges and increased loss. Conventional polymer films range from 10 to 20 μm in thickness. Therefore energy density can often be rather low in all but the highest voltage capacitor designs. However, film less that 5 μm and even less than 1 μm is becoming available so that high energy density can, in principal, be achieved at low voltage.

Electrolytic capacitors consist of a dielectric film that is grown on a metal anode by electrochemical reactions. The dielectric can be aluminum oxide ($Al_2O_3$–k=8); tantalum oxide ($Ta_2O_5$–K=25), or niobium oxide ($Nb_2O_5$). The anode that the film is grown on has a very high surface area so that the "A" term in equation (1) is very large resulting in a large capacitance (can be as high as 10,000's μF). For aluminum electrolytics the film is grown on an etched sheet of aluminum metal. For Ta and Nb electrolytics the film is grown on a porous, sintered sponge of Ta or Nb metal particles. In both cases the cathode is in contact with an electrolyte which is a liquid for aluminum capacitors and a solid or liquid for Ta and Nb capacitors. For aluminum capacitors the film is rolled and placed in a cylindrical package, which is then back-filled with electrolyte. Electrolytics have a high capacitance due to the relatively high k of the dielectric and very high surface area. The films are very thin therefore even at small voltages the electric fields are very high. As a result these capacitors have an energy density nearing 1 J/cm$^3$. They can be used for both pulse and power conditioning applications. Unfortunately, the electrolyte cathode results in very high losses, and a lot of capacitors must be connected in parallel to prevent overheating in high frequency power conditioning. For pulse power applications the losses limit how fast the capacitor can be discharged. They are also limited in temperature to about 80 to 100° C. due to conduction effects and reliability concerns, and aluminum capacitors can not be made to operate above 500V due to limitations in how thick the dielectric layer can be. Ta and Nb capacitors are limited to even lower voltages. Therefore, many capacitors must be connected in series for high voltage circuits.

Ceramic and glass capacitors are used in a broad variety of applications including very compact, severe environment, and very high power electronics. Ceramic formulations cover a wide range of dielectric constants from approximately 5 for glass capacitors to about 40 for temperature stable compositions, and from about 2000 to over about 10,000 for large capacity or very compact applications. They can also be made to operate at very high voltages (>10,000 V). The largest ceramic capacitors are on the order of 10's of μF. However, the breakdown field of ceramic is generally much less than polymers therefore the energy densities of these components are rarely higher than 0.2 J/cm$^3$. In addition ceramics with high dielectric constants exhibit field dependence so that as field and voltage is increased the dielectric constant decreases. This results in lower energy density than would be expected from low field measurements of capacitance. However, unlike polymers this energy density can be achieved in both pulse and power conditioning applications because ceramics have relatively low losses and much greater temperature stability than polymers. Ceramics are less affected by heat generation during AC drive than the other capacitor technologies. Ceramics find wide use in power conditioning applications, but are used less in pulse power applications because they are more expensive than polymers for large capacitor banks and they tend to fail catastrophically. The layers in ceramic capacitors can be made very thin with 1 to 2 μm being the current state-of-the-art. Therefore, the maximum energy density for these dielectrics can be achieved at low voltages.

Mica capacitors are used for high temperature and high voltage applications. Unfortunately their energy densities are very low because their dielectric, mica paper, has a low dielectric constant, and only a moderate breakdown strength. In addition mica paper can only be manufactured in relatively thick sheets. This is good for high voltage capacitors, but it also results in very low capacitance and since the electric fields on the sheets tend to be quite low the energy density is generally <0.1 J/cm$^3$.

Super and Ultracapacitors are electrochemical devices that use carbon fiber to create extremely high surface area electrodes which result in very high capacitance values. Their energy densities can be as high as 10 J/cm$^3$ and capacitance values range from mF to Farads. However, operating voltages are limited to only about 4V requiring extensive series stacking for higher voltage power applications. They have very high losses limiting discharge times to the order of seconds. They also have temperature limitations similar to polymers and electrolytics. They find use in moderate to large scale, low frequency power conditioning applications, but not in pulse power and not in high frequency power conditioning the operating regime of state-of-the-art solid state power converter technology.

State-of-the-art and future power conditioning and pulse power systems require much smaller capacitors than are currently available. Size reductions of a factor of 2 or better are required to enable many applications such as electric vehicles, electric ships and aircraft, and pulse power weapons and electromagnetic armor on mobile platforms. These capacitors need to operate efficiently at frequencies ranging from 1 kHz to greater than 500 kHz and they must be able to discharge repeatably in less than 1 μs. They also need to operate over a broad temperature range from <−55° C. to >200° C. No existing capacitor technology can meet these exacting requirements. Advanced capacitor technologies in development to go beyond the state-of-the-art include 1) New polymer dielectrics with dielectric constants >50 and/or expanded temperature capabilities
2) Thin film dielectrics such as diamond like carbon (DLC) and aluminum oxynitride (ALON)
3) Super capacitors made with carbon nanotubes.

However, these developing technologies have encountered manufacturing and cost difficulties that have prevented these technologies from meeting capacitor requirement demands for pulse power and high frequency power conditioning.

Of the above technologies, only polymers and thin film dielectrics can meet the needs for high frequency, fast discharge power electronics. Polymers can be made to have high energy densities and some have been developed to operate at elevated temperature, but to date none exhibit high energy density over a broad temperature range. Thin films dielectrics have the potential to meet the needs of emerging power electronics technology, but to date, these capacitors must be made by depositing a film of dielectric on a carrier substrate that is incorporated into the structure of the capacitor. This fills capacitor volume with material that does not store energy greatly reducing the capacitor energy density. In addition, capacitors made with thin film technology are likely to be very expensive due the long times and expensive equipment needed to deposit films. Making super and ultracapacitors with carbon nanotubes increases energy density, nanotube capacitors still suffer from the same high losses, slow discharge times, low voltage limits and narrow temperature limits as conventional super and ultracapacitors.

Antiferroelectrics based on the $(Pb,La)(Zr,Ti)O_3$ (PLZT) material system have been proposed previously for use in energy storage capacitors in U.S. Pat. No. 4,027,209. Materials in this composition family can exhibit very high energy densities (on the order of 12 J/cm$^3$) although these high values come at the cost of high loss (~15%) and high required electric field. Both factors make it difficult to use these materials in AC power applications with operating voltages in the 500 to 2000V range. In addition, PLZT materials with high Zr content have high vapor pressures making them difficult to process.

What is needed is a high energy density capacitor formed of a high energy density, broad temperature range dielectric material that can be fabricated using conventional or nearly conventional manufacturing methods, which does not suffer from the drawbacks of the prior art.

SUMMARY OF THE INVENTION

In one embodiment of the invention, a high energy density, antiferroelectric material for use in a high energy density, antiferroelectric multilayer ceramic capacitor is disclosed that includes a composition selected from the group:

$Pb(Sn_x,Zr_y,Ti_z)O_3$ with x+y+z=100 mol % and x ranging from 0.1 to 80 mol %, y ranging from 0 to 99.9 mol %, and z ranging from 0 to 30 mol %; and
$(Pb_{1-z}M_z)_{1-t}R_t(Sn, Zr, Ti)_{1-t/4}O_3$; and
$(Pb_{1-z}M_z)_{1-t(3/2)}R_t(Sn, Zr, Ti)O_3$; and
$C[(Pb_{1-z}M_z)_{1-t}R_t(Sn, Zr, Ti)_{1-t/4}O_3]+1-C[(Pb_{1-z}M_z)_{1-t(3/2)}R_t(Sn, Zr, Ti)O_3]$;

with M being an ion with a 2+ valance from the group of elements containing Ca, Sr, and Ba with z ranging from 0 to 20 mol % and the portions of Sn, Zr, and Ti varying over the ranges indicated in (1) above; with R being an ion with 3+ valance from the group of elements containing La, Ce, Pr, Nd, Pm, Sm, Eu, Gd, Tb, Dy, Ho, Er, Tm, Yb, or Lu; t ranging from 0 to 10 mol %; and C ranging from 0 to 1.

In another embodiment of the invention, a high energy density, antiferroelectric multilayer ceramic capacitor is disclosed that includes at least one ceramic layer comprising a composition selected from the group:

$Pb(Sn_x,Zr_y,Ti_z)O_3$ with x+y+z=100 mol % and x ranging from 0.1 to 80 mol %, y ranging from 0 to 99.9 mol %, and z ranging from 0 to 30 mol %; and
$(Pb_{1-z}M_z)_{1-t}R_t(Sn, Zr, Ti)_{1-t/4}O_3$; and
$(Pb_{1-z}M_z)_{1-t(3/2)}R_t(Sn, Zr, Ti)O_3$; and
$C[(Pb_{1-z}M_z)_{1-t}R_t(Sn, Zr, Ti)_{1-t/4}O_3]+1-C[(Pb_{1-z}M_z)_{1-t(3/2)}R_t(Sn, Zr, Ti)O_3]$;

with M being an ion with a 2+ valance from the group of elements containing Ca, Sr, and Ba with z ranging from 0 to 20 mol % and the portions of Sn, Zr, and Ti varying over the ranges indicated in (1) above; with R being an ion with 3+ valance from the group of elements containing La, Ce, Pr, Nd, Pm, Sm, Eu, Gd, Tb, Dy, Ho, Er, Tm, Yb, or Lu; t ranging from 0 to 10 mol %; and C ranging from 0 to 1.

The capacitor further includes a conductive electrode formed upon at least one ceramic layer.

In yet another embodiment of the invention, a method of making a high energy density, antiferroelectric material for use in a high energy density, antiferroelectric multilayer ceramic capacitor is disclosed that includes forming a powder mixture, mixing the powder mixture to form a slurry, drying the slurry to remove the solvent, and heating the dried slurry to form a antiferroelectric material having a predominantly perovskite crystalline structure having a composition selected from the group including:

$Pb(Sn_x,Zr_y,Ti_z)O_3$ with x+y+z=100 mol % and x ranging from 0.1 to 80 mol %, y ranging from 0 to 99.9 mol %, and z ranging from 0 to 30 mol %; and
$(Pb_{1-z}M_z)_{1-t}R_t(Sn,Zr,Ti)_{1-t/4}O_3$; and
$(Pb_{1-z}M_z)_{1-t(3/2)}Rt(Sn,Zr,Ti)O_3$; and
$C[(Pb_{1-z}M_z)_{1-t}R_t(Sn, Zr, Ti)_{1-t/4}O_3]+1-C[(Pb_{1-z}M_z)_{1-t(3/2)}R_t(Sn, Zr, Ti)O_3]$;

with M being an ion with a 2+ valance from the group of elements containing Ca, Sr, and Ba with z ranging from 0 to 20 mol % and the portions of Sn, Zr, and Ti varying over the ranges indicated in (1) above; with R being an ion with 3+ valance from the group of elements containing La, Ce, Pr, Nd, Pm, Sm, Eu, Gd, Tb, Dy, Ho, Er, Tm, Yb, or Lu; t ranging from 0 to 10 mol %; and C ranging from 0 to 1.

The powder mixture includes a raw material powder, a solvent; and pH adjusters. The raw material powder includes about stoichiometric proportions of oxides, carbonates, hydroxides or hydrated versions thereof to form the high energy density, antiferroelectric material.

Other features and advantages of the present invention will be apparent from the following more detailed description of the preferred embodiment, taken in conjunction with the accompanying drawings that illustrate, by way of example, the principles of the invention.

DETAILED DESCRIPTION OF THE INVENTION

The present invention now will be described more fully hereinafter with reference to the accompanying drawing, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The invention makes use of a class of materials known as antiferroelectrics which are ceramics that exhibit high breakdown strengths and dielectric permittivities that increase with electric field. This is in contrast to polymers, electrolytics, mica, supercapacitors, glass, and many types of ceramic capacitors all of which make use of linear dielectrics. These have dielectric permittivities that do not change value with applied field. An exception is ceramic capacitors with high dielectric constants (1000's to 10,000's). These make use of modified $BaTiO_3$, a ferroelectric ceramic. Ferroelectrics are nonlinear dielectrics in which permittivity decreases with increasing electric field.

Dielectrics store energy through the change in polarization induced by an electric field. Polarization is related to electric field through the dielectric constant $$P \sim D \text{ for } k(E) \gg 1 \quad (5)$$

$$P \approx k(E) \varepsilon_0 E \quad (6)$$

The dielectric constant is a function of the polarization as follows:

$$k(E) = \frac{1}{\varepsilon_0} \frac{dP}{dE} \quad (7)$$

That is, the dielectric constant is the derivative of the polarization versus field curve. The energy density is then the area between the polarization field curve and the polarization axis.

Figures 1A, 1B, 1C:
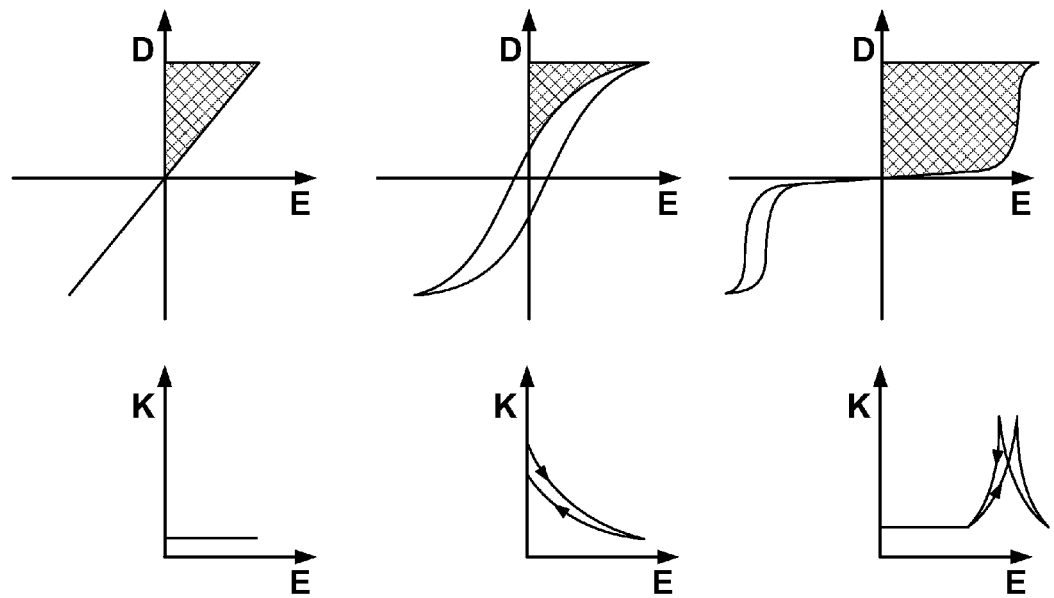
FIGS. 1A, 1B and 1C illustrate a dielectric displacement-electric field behavior for a linear/paraelectric dielectric, a ferroelectric dielectric, and antiferroelectric dielectric, respectively.

FIGS. 1A, 1B and 1C show the dielectric displacement-electric field behaviors for linear/paraelectric, ferroelectric, and antiferroelectric dielectrics, respectively. The shaded area indicates the amount of energy recoverable upon discharging. The symbols D, K, and E represent electric displacement which is approximately equal to polarization P, dielectric constant, and electric field, respectively. A linear dielectric exhibits linear polarization versus field behavior. The dielectric constant is not field dependent, and the energy density is the triangular region between the y-axis and the curve. The maximum polarization level for most linear dielectrics ranges from 0.1 to 1 $\mu C/cm^2$. Dielectric constants typically range from 3 for polymers to the low 100's for some ceramics.

The ferroelectric dielectric exhibits polarization-field hysteresis and then polarization saturation. This results in a different dielectric constant as field is increased compared to decreased and a decreasing dielectric constant with increasing field. The shaded region between the field decreasing polarization curve and the y-axis is the stored energy recoverable on discharge. However, unlike the linear dielectric there is now a large region between the field ascending and descending curves. This is the portion of energy input into the dielectric that is lost as heat on discharge. The polarization level for most ferroelectrics ranges from 10 to 30 $\mu C/cm^2$ and dielectric constants are generally in the 1000 to 5000 range. Despite these much higher values compared to linear dielectrics, polarization saturation and hysteresis loss result in ferroelectrics having disappointing recoverable energy density compared to linear dielectrics.

The current invention is a new class of antiferroelectric materials formulated to yield high energy density with very low hysteresis loss. An aspect of the invention is processing the same materials into multilayer ceramic capacitors. Another aspect of the invention is to include process steps that result in very high quality dielectrics and capacitors with breakdown strengths over 2 times higher than the antiferroelectric to ferroelectric transition field. Another aspect of the invention is the use of these capacitors or assemblies of these capacitors in pulse-discharge circuits where the capacitor(s) is charged slowly, held at a voltage for a period of time and then rapidly discharged (speeds of many seconds to <1 μs). Another aspect of this invention is to place these capacitors across the DC bus of a power inverter or converter to circuit to help maintain the bus voltage at a constant value. Yet another aspect of this invention is to use the capacitors across the DC bus to filter AC noise such as voltage ripple and transient voltage spikes that can result from normal operation of solid-state power transistor devices or from interruptions in voltage supplied to the power inverter or converter circuit. In this aspect of the invention an increasing capacitance with electric field is particularly important since the amount of capacitance needed to suppress transients or ripple increases as the transient or ripple voltage increases. Thus the capacitor is more effective at filtering as the strength of the signal it is trying to filter increases. This makes antiferroelectric capacitors more effective filters than an equivalently sized linear capacitor. It is an additional aspect of this invention to use the capacitors for general filtering and energy storage applications in any part of an electric circuit designed to deliver, control or condition electrical power.

Figure 2:
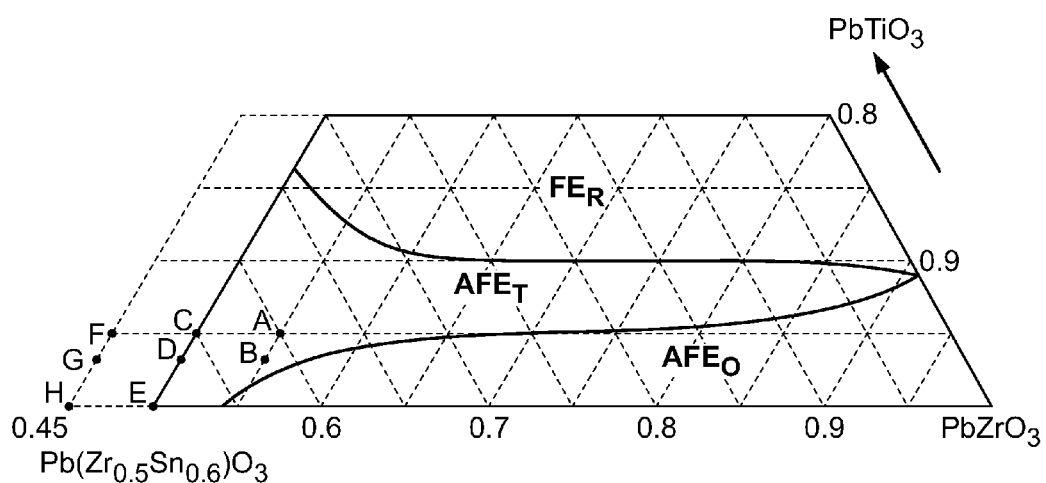
FIG. 2 illustrates a partial ternary phase diagram of the PSnZT family of ceramics.

This invention makes use of materials in the Pb(Sn, Zr, Ti)$O_3$ (PSnZT) composition family. FIG. 2 shows a partial ternary phase diagram showing the phases that result from solid solutions of Pb(Sn$_{0.45}$Zr$_{0.55}$)$O_3$, PbZr$O_3$ and PbTi$O_3$. This figure is the high Sn & Zr content portion of the diagram. We have determined that as one moves towards the high Zr:Ti ratio portion of the diagram the antiferroelectric-to-ferroelectric phase transition moves to higher electric field, and as one moves the high Sn:Zr portion of the diagram the hysteresis decreases. Therefore, high energy density, low loss compositions lie in the lower left-hand corner of the diagram near the Sn, Zr content of 0.5, 0.5. In addition to these basic compositions there are multiple dopants that can be added. These include preferably La, Sr, Ba, and Ca but also Ce, Pr, Nd, Pm, Sm, Eu, Gd, Tb, Dy, Ho, Er, Yb, and Lu partially in place of Pb which can increase the saturation polarization value to further increase energy density and/or decrease hysteresis.

Other dopants include preferably $MnO_2$ but also $Cr_2O_3$, $V_2O_5$, CoO, and NiO added after formation of the PSnZT crystal structure to decrease dielectric loss, decrease hysteresis heating, and increase resistivity.

This invention includes the following composition formulations:

$Pb(Sn_x,Zr_y,Ti_z)O_3$ with x+y+z=100 mol % and x ranging from 0.1 to 80 mol %, y ranging from 0 to 99.9 mol %, and z ranging from 0 to 30 mol %; and $(Pb_{1-z}M_z)_{1-t}R_t(Sn, Zr,Ti)_{1-t/4}O_3$; and $(Pb_{1-z}M_z)_{1-t(3/2)}Rt(Sn,Zr,Ti)O_3$; and $C[(Pb_{1-z}M_z)_{1-t}R_t(Sn, Zr, Ti)_{1-t/4}O_3]+1-C[(Pb_{1-z}M_z)_{1-t(3/2)}R_t(Sn, Zr, Ti)O_3]$;

with M being an ion with a 2+ valance from the group of elements containing Ca, Sr, and Ba with z ranging from 0 to 20 mol % and the portions of Sn, Zr, and Ti varying over the ranges indicated in (1) above; with R being an ion with 3+ valance from the group of elements containing La, Ce, Pr, Nd, Pm, Sm, Eu, Gd, Tb, Dy, Ho, Er, Tm, Yb, or Lu; t ranging from 0 to 10 mol %; and C ranging from 0 to 1.

Any of the above compositions may optionally contain in addition or deficient about 0 to about 5 wt % PbO. In other words, for additional PbO, the amount of Pb indicated in each formula above is increased by about 0 to about 5 wt %. For deficient PbO, the amount of Pb indicated in the formulas above is decreased by about 0 to about 5 wt %.

Furthermore, any of the above compositions may optionally contain in addition with about 0 to about 10 wt % borosilicate or Pb-borosilicate glass consisting of about 10 wt % to about 20 wt % boron oxide and/or about 50 wt % to about 80 wt % Pb oxide with the balance made up with $SiO_2$.

Additionally, any of the above compositions may optionally contain in addition about 0 to about 1 wt % of each of the compounds $MnO_2$, $Cr_2O_3$, $V_2O_5$, CoO, and NiO.

Figure 3A:
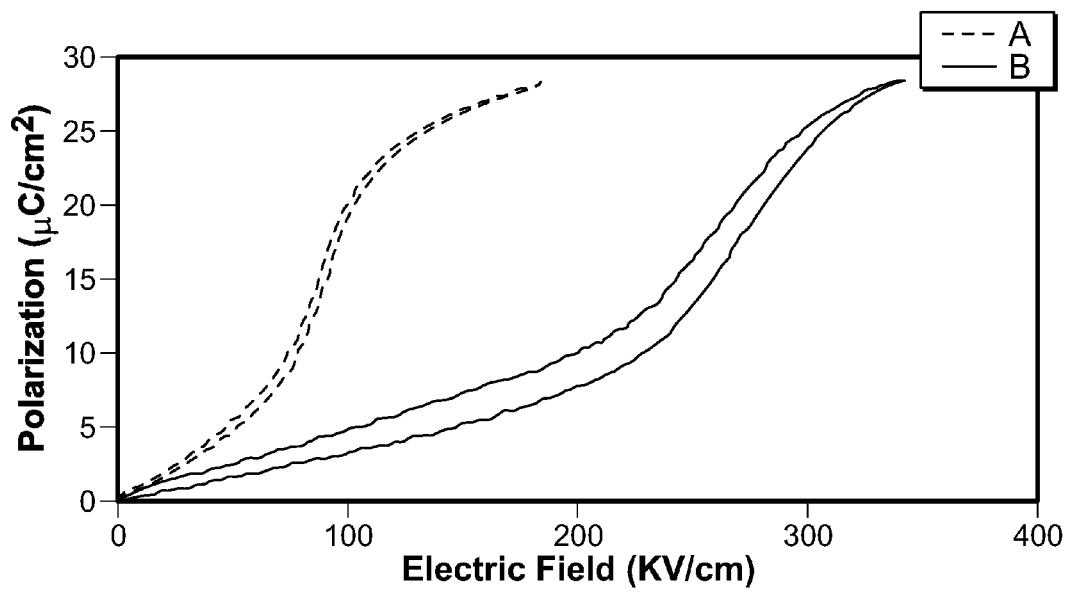
FIGS. 3A and 3B illustrate a polarization vs. electric field and energy density vs. electric field for the exemplary Compositions A and B of the present invention, respectively.
Figure 3B:
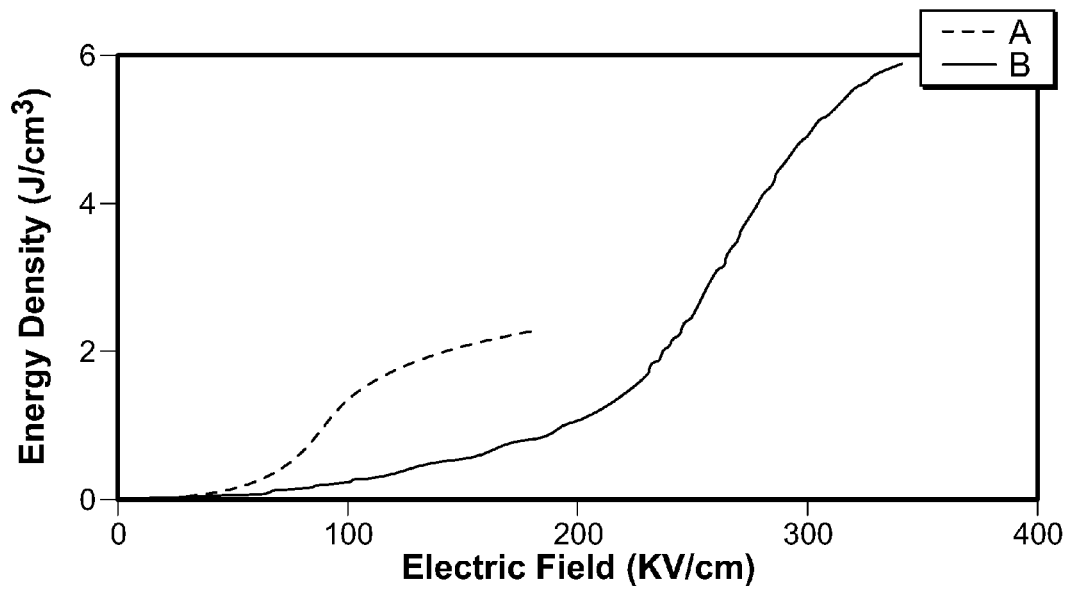

Two specific compositions of the PSnZT composition family are of particular interest to this invention. $(Pb_{0.885}La_{0.02}Sr_{0.08})(Sn_{0.37}Zr_{0.50}Ti_{0.13})_{0.9975}O_3$, designated Composition A, is a very low loss, high resistivity composition that is particularly useful for AC filtering applications. Composition A can optionally include 0 to about 3 wt %, and preferably about 0.1 wt %, $MnO_2$. Second, $Pb_{0.98}La_{0.02}(Sn_{0.55}Zr_{0.45})_{0.995}O_3$, designated Composition B, is a moderately low loss, very high energy density composition that is particularly useful for pulse power applications. Composition B can optionally include 0 to about 3 wt %, and preferably about 0.1 wt %, $MnO_2$. Polarization vs. electric field curves and energy density vs. electric field for Compositions A and B, are shown in FIGS. 3A and 3B, respectively.

Power capacitors must be reliable. Since they are insulting components, a failure resulting in a short circuit may cause a catastrophic failure of an entire system. For example, at high power levels, a failure of a power capacitor may be a severe hazard to nearby systems or personnel. In addition, high power levels require high capacitance levels to store the necessary energy for discharge or filtering. Furthermore, high power levels often require high voltages or high voltages generated at a power source must often be converted into much lower voltages and high current for use. Finally, power systems generate large amounts heat and the thermal environment for power electronic components is reaching ever higher temperatures as the size of power systems and the platforms they are used on are reduced. High energy density capacitors for state-of-the-art and future power systems must be capable of operating at temperatures in excess of about 150° C. To make the above compositions useful for capacitor applications, a process for developing multilayer ceramic capacitors has been developed that results in large valued, high voltage capacitors with failure voltages at over 2× the intended operating voltage and maximum operating temperatures over about 200° C.

Figure 4:
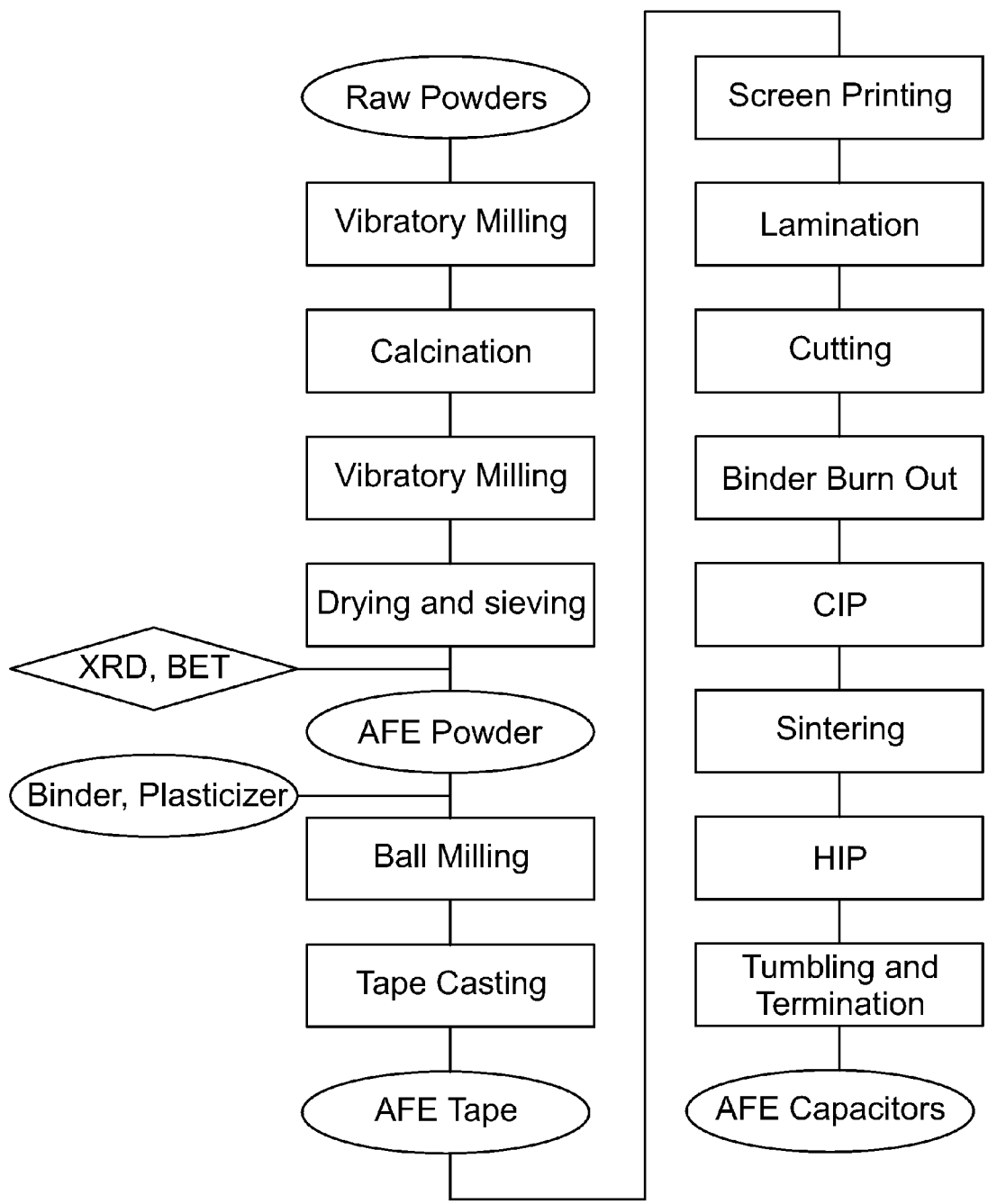
FIG. 4 illustrates an exemplary embodiment of a process for forming an antiferroelectric layered capacity according to the invention.

An exemplary process used to make antiferroelectric power capacitors is shown in FIG. 4. The process includes mixing raw materials in stoichiometric proportions to form the desired antiferroelectric material. These raw materials can be either oxides, carbonates, hydroxides, or hydrated versions thereof containing the desired metal element and can include, for example, PbO, $PbCO_3$, $2PbCO_3.Pb(OH)_2$, $Pb_3O_4$, $La_2O_3$, $SrCO_3$, $SnO_2$, $ZrO_2$, and $TiO_2$. The average particle sizes of the starting powders should be between about 0.1 μm and about 1 μm and surface areas should be between about 1 $m^2/g$ and about 20 $m^2/g$. In one embodiment, the starting powders should be between about 0.2 μm and about 0.5 μm with a surface area between about 1 $m^2/g$ and about 4 $m^2/g$. The raw materials are mixed by forming a slurry containing about 10 vol. % to about 40 vol. % by solids, preferably about 35 vol % solids, deionized water, pH adjusters such as $NH_4OH$, and $NH_4OH$ based dispersants to form a slurry with a pH ranging from about 9 to about 12, preferably about 10 or a slurry containing about 10 vol. % to about 30 vol. % solids, preferably about 20 vol % solids, an organic solvent such as ethanol, isopropanol, or acetone, and which could include a non-ionic dispersant. The non-ionic dispersant may be, for example, an oligomeric dispersant such as fish oil. An aqueous or non-aqueous based slurry may be provided based on compatibility with the binder system used to make the ceramic film in forming the capacitor.

The raw material powders can be dispersed into the water or solvent using a mixing device, such as a shear mixer. The raw material powders can be further dispersed by milling the mixture with a vibratory mill or a roller mill in which the slurry is placed in a container with ceramic media and either vibrating or rolling the container for about 1 to about 24 hours. The container should be formed of or lined with a material inert to the powder mixture. For example, the container may be composed of or lined with a polymer such as polyethylene or polyurethane. Additionally, the ceramic media should be selected so to not contaminate the powder mixture. For example, the ceramic media may be a calcium or an yttrium-stabilized $ZrO_2$ balls or cylinders.

After mixing, the slurry is dried. For example, the slurry may be dried by pouring it in a pan and placing the pan in an oven at a temperature sufficient to evaporate the water or solvent from the slurry. The slurry can also be dried by forming droplets of slurry on a moving belt, which first transports the slurry droplets under a heater to evaporate the solvent and then transports the dried droplets into a container.

After drying, the powder mixture is placed in a furnace and heated to a temperature sufficient to cause the raw materials to react and form a perovskite crystal structure. The heating can be done in a box furnace with the powder mixture placed in a refractory ceramic crucible formed of an inert material such as $Al_2O_3$ or MgO, or in a rotary calciner designed to react the powder mixture continuously as it is fed through an inclined, rotating refractory tube that extending through a heated furnace.

Figure 5A:
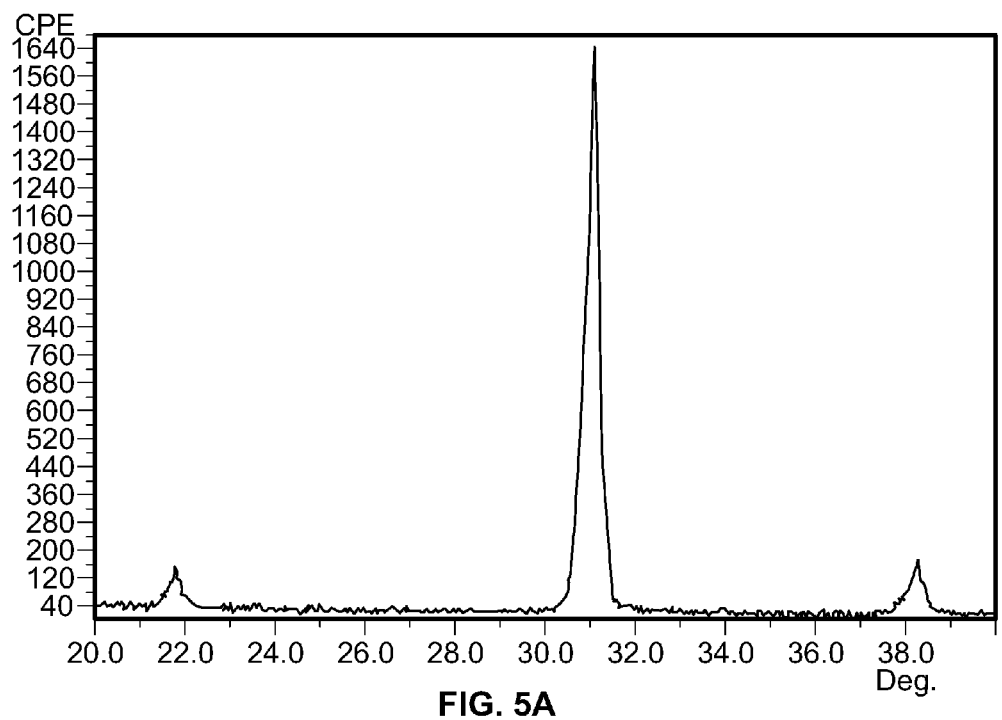
FIGS. 5A and 5B illustrate exemplary X-ray diffraction patterns for Compositions A and B of the present invention, respectively.
Figure 5B:
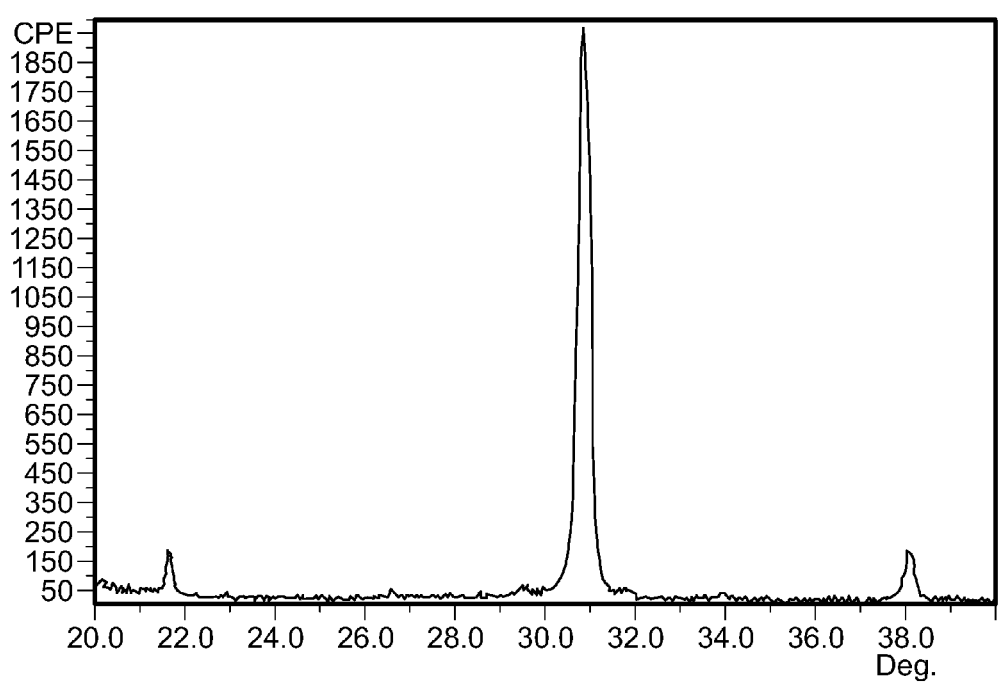

The antiferroelectric formulations discussed above were formed at calcination temperatures ranging from about 700° C. to about 1100° C. Complete reaction was verified by conducting X-ray diffraction on a sample of reacted material. The reaction is complete if the X-ray diffraction pattern exhibits perovskite phase peaks with only very minor peaks of less than 10% the intensity of the strongest peak coming from $2^{nd}$ phases or unreacted raw materials. Examples of X-ray diffraction patterns for the compositions $(Pb_{0.885}La_{0.02}Sr_{0.08})$ $(Sn_{0.37}Zr_{0.50}Ti_{0.13})_{0.9975}O_3$, designated A, and $Pb_{0.98}La_{0.02}$ $(Sn_{0.55}Zr_{0.45})_{0.995}O_3$, designated B above are shown in FIGS. 5A and B, respectively.

After reaction is complete, the particle size of the reacted powder needs to be reduced in order to fabricate high quality capacitors. First, the reacted powder particle size is reduced by coarsely crushing or milling the dry powder by using a mortar and pestle, a hammermill, a jet mill, a dry roller mill, or other similar reduction apparatus. After crushing or milling, the powder size is controlled by sifting the powder through a sieve with at least an 80 mesh size. Any remaining coarse powder caught in the sieve can be reground and passed through the sieve. The average particle sizes of the powder should be between about 0.1 µm and 2 µm and surface areas should be between about 1 $m^2/g$ and about 20 $m^2/g$. In one embodiment, the reacted powders have an average particle size of between about 0.2 um and about 1.0 um, and a preferred particle size of about 0.5 um, and a surface are of between about 0.5 $m^2/g$ and about 4.0 $m^2/g$, and a preferred surface area of about 1.5 $m^2/g$.

After sieving, the powder is wet milled in a roller mill, vibratory mill, attrition mill or other similar milling apparatus for particle size reduction.

A slurry is then formed by a method similar to that described above for mixing the raw powders. The slurry is formed by mixing powder and other slurry components to form a slurry containing between about 10 vol. % and about 40 vol. % solids, preferably about 35 vol % solids, deionized water, pH adjusters such as $NH_4OH$, and $NH_4OH$ based dispersants to adjust the pH to between about 9 and about 12, preferably to about 10, or the slurry may be formed containing about 10 vol. % to about 30 vol. % solids, preferably about 20 vol % solids, an organic solvent such as ethanol, isopropanol, or acetone, and which could include a non-ionic dispersant such as fish oil. As in forming the raw material powders, an aqueous or non-aqueous based slurry may be provided based on compatibility with the binder system later used to make the ceramic film in forming the capacitor.

The powder can be dispersed into the water or solvent using a mixing device, such as a shear mixer. The powder can be further dispersed by milling the mixture with a vibratory mill or a roller mill in which the slurry is placed in a container with ceramic media and either vibrating or rolling the container for about 1 to about 24 hours. The container should be formed of or lined with a material inert to the powder mixture. For example, the container may be composed of or lined with a polymer such as polyethylene or polyurethane. Additionally, the ceramic media should be selected so to not contaminate the powder mixture. For example, the ceramic media may be a calcium or an yttrium-stabilized $ZrO_2$ balls or cylinders.

After milling, the powder is dried by dumping the slurry in a container, placing the container in an oven, and heating the oven to a temperature sufficient to evaporate the volatile components from the slurry and form a powder cake.

The powder cake is lightly crushed with a mortar and pestle or other similar light crushing apparatus, and sieved through at least an 80 mesh sieve. The average particle size of the powder should be between about 0.1 µm and about 1 µm, and preferably between about 0.2 µm and about 0.5 µm, and the surface area should be between about 1 $m^2/g$ and about 10 $m^2/g$, and preferably between about 2 $m^2/g$ and about 4 $m^2/g$. The particle size can be tested throughout milling using a laser diffraction or sedimentation particle size analyzer and the surface area can be tested after drying using a BET surface area tester.

The sized powder is then mixed with organic compounds and cast into a thin sheet to be used in capacitor construction by the following exemplary method. The powder is put into a roller mill jar with a solvent. The solvent may be toluene, ethanol, cyclohexanone, alone or in combination, or may be any other equivalent solvent. A steric stabilizing dispersant, for example a solution of alkylammonium salts of acidic polymers, a polyvinyl butyral binder, a plasticizer such as benzyl butyl phthalate are also added. Additionally, a belt release agent such as polyethylene glycol may also be added. A typical tape casting formulation includes about 60 wt % to about 80 wt % antiferroelectric ceramic powder, about 5 wt % to about 15 wt % ethanol, about 5 wt % to about 10 wt % toluene, 0 to about 2 wt % cyclohexanone, 0 to about 1 wt % steric dispersant, about 1 wt % to about 7 wt % polyvinyl butyral binder, 0 to about 5 wt % benzyl butyl phthalate plasticizer, and 0 to about 2 wt % 200 molecular weight polyethylene glycol casting belt release agent. The slurry is roller milled in a jar with ceramic media for about 1 hour to about 50 hours. The slurry is then de-aired in a vacuum chamber or centrifuge and cast onto a stainless steel or mylar belt using a doctor blade to form a thin film. Slurry viscosity at the time of casting is controlled to be between about 1000 to about 2000 centipoise, and can be adjusted with solvent and dispersant additions. The thin film of slurry is carried on the belt through a drying chamber to remove any volatile components including solvents and dispersants to form a tape. The ceramic tape is then spooled on a roller for further fabrication into a capacitor. Cast ceramic tape thickness ranges between about 10 µm and about 50 µm depending on the desired application. In alternative embodiments, the ceramic tape may be less than about 10 um or greater than about 50 um depending on application.

Figure 6:
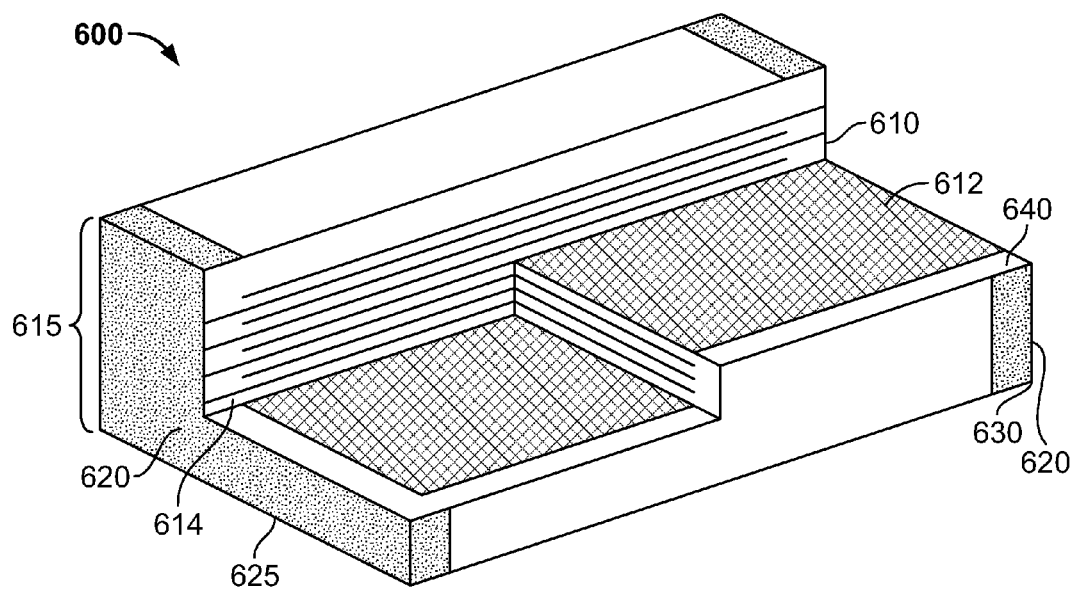
FIG. 6 illustrates an exemplary antiferroelectric multilayer ceramic capacitor formed in accordance with the invention.

In an exemplary method of fabricating the ceramic tape into a capacitor, the ceramic tape is printed with a metal ink using a screen printer and cut into ceramic sheets. The metal ink consists of metal particles such as platinum (Pt), palladium (Pd), silver-palladium alloy (Ag—Pd), or platinum-palladium-gold alloy (Pt—Pd—Au) dispersed in an organic solvent and binder. The metal ink forms the internal electrodes of the multilayer capacitor. As shown in FIG. 6, a multilayer ceramic capacitor 600 is formed from the printed ceramic sheets 610. The printed ceramic sheets 610 include metal prints 612 on ceramic sheets 614, which are stacked to form a stack 615. The stack 615 is configured so that half of the metal prints 612 are exposed have terminations 620 on a first side 625 of the stack 615, and the other half of metal prints 612 are exposed have terminations 620 on a second side 630 of the stack 615. As can be seen in FIG. 6, the orientation of each printed ceramic sheet 610 is such that a metal print 612 is exposed on an opposite side of the stack as its two adjacent layers. One set of exposed metal prints 612 with terminations 620 applied forms the positive terminal of the multilayer ceramic capacitor 600 while the other set of exposed metal prints 612 with terminations 620 applied forms the negative terminal of the multilayer ceramic capacitor 600. In this configuration, the stack 615 of individual printed ceramic sheets 610 forms a multitude of individual parallel plate capacitors that will be connected in parallel so that the capacitance of each layer adds to the total capacitance of the multilayer ceramic capacitor 600. On the sides of the stack 615 that do not have terminations 620, the metal prints 612 forming an electroded region in the interior of the stack 615 is surrounded by a ceramic margin 640. FIG. 6 shows a basic construction of an exemplary multilayer ceramic capacitor 600 formed according to this method.

The electrode ink includes metal particles that will sinter at high temperature to form a dense, continuous metal electrode over about the same temperature range that the antiferroelectric ceramic densifies. Examples of compatible electrode metals include Pt, Pd, Pt—Pd—Au alloys with proportions of about 40 wt % Pt, 40 wt % Au, 20 wt % Pd being preferred, and Ag/Pd alloys with proportions of about 70 wt % Ag/30 wt % Pd being preferred. The electrode ink is printed onto the ceramic tape through a screen patterned to produce a desired electrode pattern. Fine mesh screens resulting in thin electrode layers are preferred for building large valued capacitors. The printed sheets can be stacked during or after printing. The sheets are then laminated together to form a monolithic body. Lamination can be done by pressing the sheets between heated platens of a hydraulic press or by placing the stack in a sealed bag and isostatically pressing the stack in a pressurized heated bath. After lamination, the organic materials in the ceramic tape and ink are removed from the capacitor by heat treating at about 0.2° C./min to about 450° C. for about 2 hours to decompose and volatilize any organic constituents. The heat treating temperature is between about 350° C. and about 650° C., and may be about 400° C.

After removing the organic materials from the capacitor an additional pressing operation can be included which greatly improves the breakdown strength of the final component. The capacitor is sealed in an evacuated flexible container such as a plastic or rubber bag. The bag is then placed into a cold isostatic press (CIP) and compacted at a high pressure of between about 10,000 to about 50,000 psi. For example, the bag can be compacted at about 30,000 psi for about 2 minutes to achieve a density of about 55%. The capacitors are then sintered to form a dense monolithic body with internal, continuous electrodes having a density of greater than 97%. This is done by heat treating at temperatures ranging from 1050 to 1300° C. for 15 min to 4 hours. Densification is done in a box furnace or tunnel kiln with the parts placed inside an $Al_2O_3$ or MgO ceramic crucible covered with a lid to prevent evaporation of PbO. Air or $O_2$ can be flowed into the furnace at a rate of 0 to 5 standard cubic feet per hour. A source powder with a PbO vapor pressure higher than the antiferroelectric in the capacitor can also be placed in the crucible along with the capacitors to further prevent evaporation of PbO from the capacitor. The source powder can consist of $PbZrO_3$ with 0 to about 10 wt % excess PbO. Recommended source powder amounts are 0.1 to 1 gram per gram of capacitor product.

After densification the parts can be treated with a final high pressure heat treatment to further improve quality and breakdown strength. The parts are placed on an $Al_2O_3$ or MgO setting plate or in a crucible of the same material and placed inside a hot isostatic press (HIP). The pressing chamber is pressurized with Ar or a mixture of $Ar/O_2$ with $O_2$ content ranging from 0 to 20%. A furnace inside the pressure chamber is heated to between about 1000° C. and about 1200° C. The chamber is pressurized with enough gas so that the pressure at maximum temperature is between about 3000 psi to about 5000 psi. The capacitors are held at this pressure and temperature for about 2 hours and the chamber is cooled and depressurized. The resulting parts have a density at or very near the theoretical maximum for the material with almost no internal defects.

After HIP, the parts are placed in a tumbling machine with ceramic media to expose the ends of the internal electrodes. The two capacitor faces with the internal electrodes exposed are terminated by coating the faces with a metal termination material. This can be silver paste, which is then densified by heat treating at between about 600° C. to about 700° C. for between about 15 min to about 1 hour. The metal termination material can also be electrochemically deposited Ni coated with electroplated copper, or the metal termination material may be Au, Pd, Pt, or Ag/Pd paste that is then densified.

After termination the capacitors can be further assembled into modules or other products by a) soldering leads to the termination, b) soldering multiple capacitors to a circuit board, c) coating capacitors with a protective epoxy, d) stacking capacitors and soldering the stack to a common lead, or e) any combination of the above.

Figure 7A:
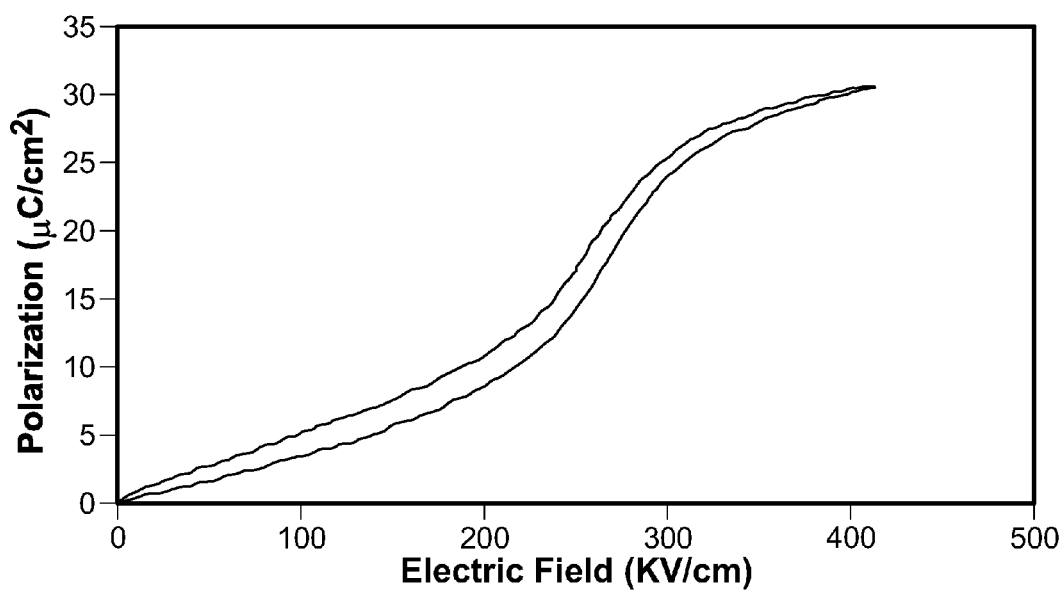
FIGS. 7A and 7B illustrate exemplary polarization vs. electric field and energy density vs. electric field results, respectively, for a 30 active layer multilayer capacitor of Composition B.
Figure 7B:
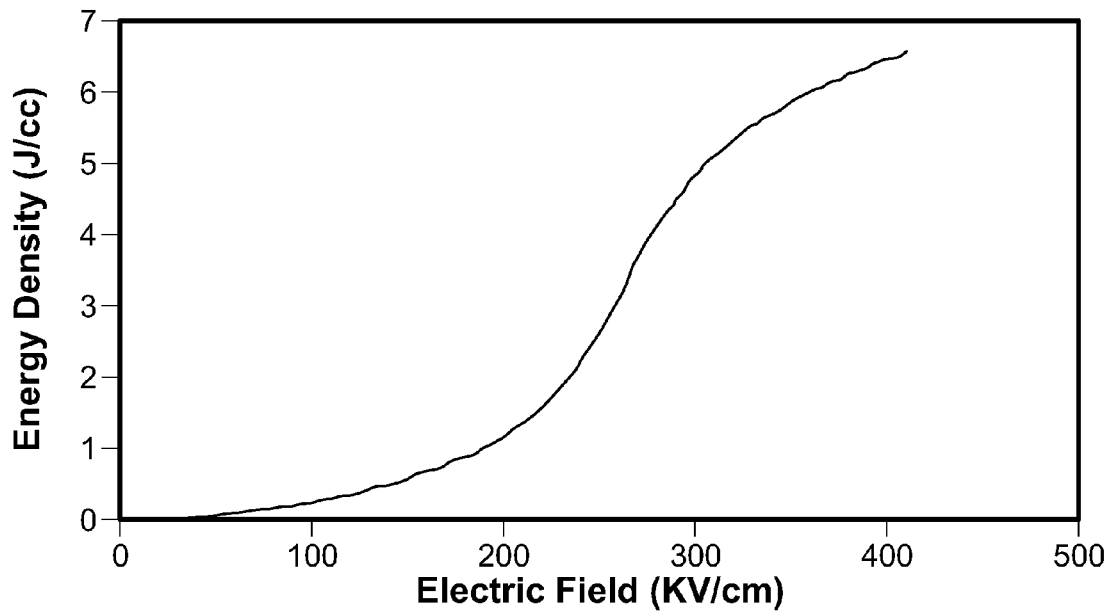

According to an Example 1, a high energy density antiferroelectric material was produced by using the $Pb_{0.98}La_{0.02}(Sn_{0.55}Zr_{0.45})_{0.995}O_3$ Composition B powder synthesized as described above. The specific mixing formula is shown in Table I. The initial mixing of the starting material was conducted in water by vibration milling for about 16 hrs. The calcined powder was vibration milled in ethyl alcohol for about 16 hrs and the specific formula is shown in Table II. Tape casting was done to produce ceramic tape having a thickness of about 33 um. The detailed batching for the tape casting slurry is shown in Table III. Pt ink was screen printed on 30 active layers for inside electrodes and 5 layers of non-printed sheets were used for top and bottom margins. The multilayer stack was laminated using an isostatic oil press at about 80° C. and at about 500 psi for about 2 hr. The laminated stack was cut and the organic binder was removed by heating at about 0.2° C./min to about 400° C. After the removal of the organic constituents, the parts were cold isostatically pressed (CIP) at about 30,000 psi for about 2 min. The parts were then sintered at about 1120° C. for about 30 min and then hot isostatically pressed (HIP) at about 1050° C. at about 5000 psi for about 2 hr. The parts were tumbled for about 30 min and Ag termination was applied. The resulting capacitor had dimensions of about 8×9×1.2 mm and inside dimension of about 0.03 mm active layer thickness, about 52 mm² electrode area per layer, and about 1560 mm² total electrode area. The capacitor had about 150 nF zero field capacitance with about 0.002 dielectric loss. The polarization behavior and energy density of the multilayer capacitor formed in accordance to Example 1 is shown in FIGS. 7A and 7B, respectively.

TABLE I

Powder mixing formula for $Pb_{0.98}La_{0.02}(Sn_{0.55}Zr_{0.45})_{0.995}O_3$ composition

| Raw material | Amount (g) | |
|---|---|---|
| $PbCO_3$ | 1682.7 | Starting material |
| $La_2O_3$ | 70.4 | Starting material |
| $SnO_2$ | 590.9 | Starting material |
| $ZrO_2$ | 398.5 | Starting material |
| DI water | 750 | Dispersing medium |
| Dispersant | 47.4 | |
| $NH_4OH$ | 34.2 | pH modifier |

TABLE II

Calcined powder milling formula

| Material | Amount (g) | |
|---|---|---|
| Powder | 2500 | Calcined powder |
| Ethyl Alcohol | 956 | Solvent |

TABLE III

Tape casting slurry mixing formula

| Material | Amount (g) | |
|---|---|---|
| Powder | 2000 | Calcined powder |
| Ethyl Alcohol | 319.2 | Solvent |
| Toluene | 227.9 | Solvent |
| Cyclohexanone | 22.7 | Dry rate modifier |
| alkylammonium salts of acidic polymers | 4.4 | Non-ionic stabilizer |
| benzyl butyl phthalate | 67.6 | Plasticizer |
| Polyvinyl Butyral | 125.1 | Binder |
| Polyethylene glycol | 20.3 | Plasticizer/release agent |

TABLE IV

Powder mixing formula for $(Pb_{0.885}La_{0.02}Sr_{0.08})(Sn_{0.37}Zr_{0.50}Ti_{0.13})_{0.9975}O_3$, composition

| Raw material | Amount (g) | |
|---|---|---|
| $PbCO_3$ | 1688.8 | Starting material |
| $La_2O_3$ | 27.5 | Starting material |
| $SrCO_3$ | 87.7 | Starting material |
| $SnO_2$ | 411.4 | Starting material |
| $ZrO_2$ | 457.8 | Starting material |
| $TiO_2$ | 76.5 | Starting material |
| DI water | 750 | Dispersing medium |
| Dispersant | 47.4 | |
| $NH_4OH$ | 34.2 | pH modifier |

Figure 8:
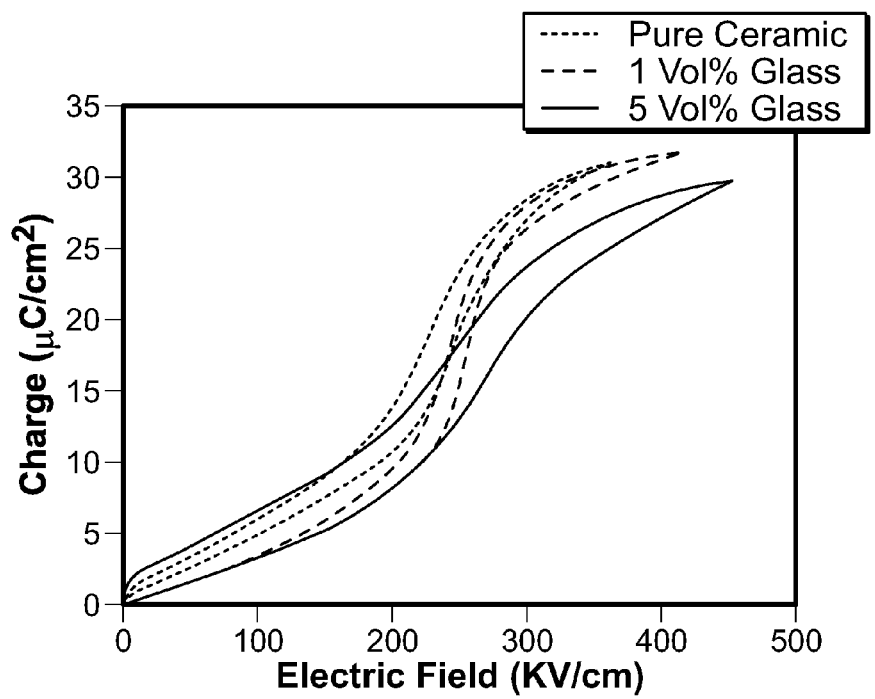
FIG. 8 illustrates an exemplary charge vs. electric field result for Composition B and for Composition B including lead borosilicate glass.

According to an Example 2, a high energy density antiferroelectric material having enhanced energy density including a glass addition was produced using the material in Example 1 according to the formula $Pb_{0.98}La_{0.02}(Sn_{0.55}Zr_{0.45})_{0.995}O_3$. For comparison, the $Pb_{0.98}La_{0.02}(Sn_{0.55}Zr_{0.45})_{0.995}O_3$ was mixed with about 1 wt % and about 5% wt % of lead borosilicate glass powder, which was separately milled for reduced particle size to approximately 1 μm. The powder mixtures were pressed into about 10 mm pellets. The pellets were then sintered and HIPed under similar conditions as in Example 1. The resulting composites showed improved breakdown strength compared to the pure ceramic as shown FIG. 8.

According to an Example 3, a high energy density, low loss, broad temperature range antiferroelectric material was produced by using powder $(Pb_{0.885}La_{0.02}Sr_{0.08})(Sn_{0.37}Zr_{0.50}Ti_{0.13})_{0.9975}O_3$, Composition A, synthesized by the method as described above. The specific mixing formula is shown in Table IV and all other powder synthesis conditions are same as in Example 1. Tape casting was conducted to produce ceramic tape with about 36 μm thickness. Pt ink was screen printed on three active layers for inside electrodes each active layer consisting of three sheets of tape and six layers of non-printed sheets were used for top and bottom margins. The laminated stack was cut and organic binder was removed then cold isostatically pressed (CIP) as same method in Example 1. The parts were sintered at about 1250° C. for about 30 min then hot isostatic pressed (HIP) at about 1150° C. and about 5000 psi for about 2 hr. The parts were tumbled for about 30 min and Ag termination was applied. The resulting multilayer capacitor has dimensions of about 6×5×0.6 mm and inside dimension of about 0.09 mm active layer thickness, about 14 mm² electrode area per layer, and about 42 mm² total electrode area. The capacitor had about 4 nF zero field capacitance with about 0.0017 dielectric loss.

Figure 9:
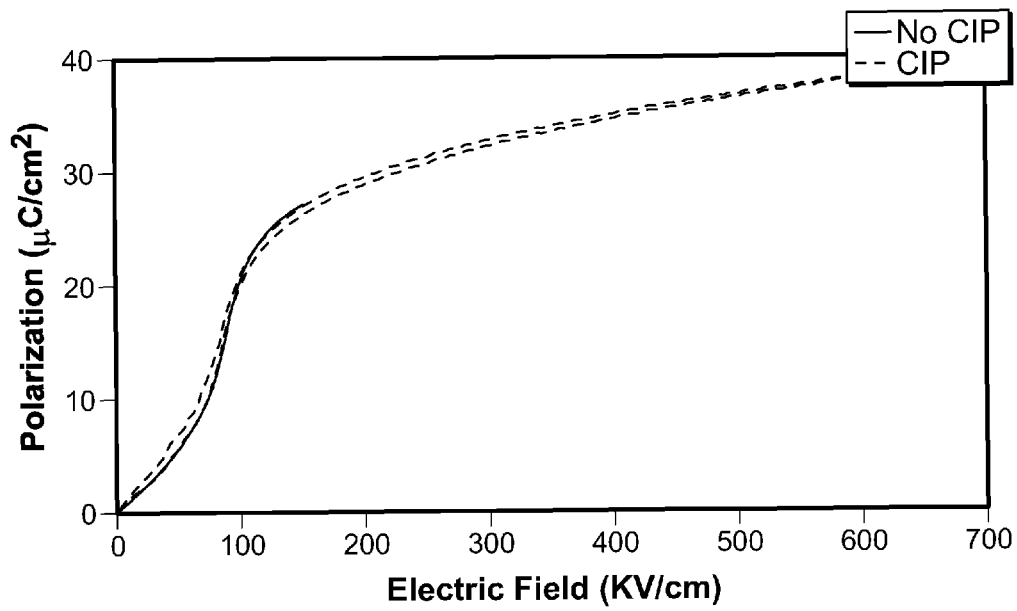
FIG. 9 illustrates an exemplary polarization vs. electric field result of a 3 active layer multilayer capacitor of Composition A with and without a CIP step.

FIG. 9 compares the polarization response of the capacitor prepared as Example 3 and a capacitor prepared under the same conditions as Example 3 except without the CIP process step between the binder burn out and sintering steps. As can be seen in FIG. 9, the dielectric strength of the capacitors is greatly improved by including the CIP process step.

Figure 10:
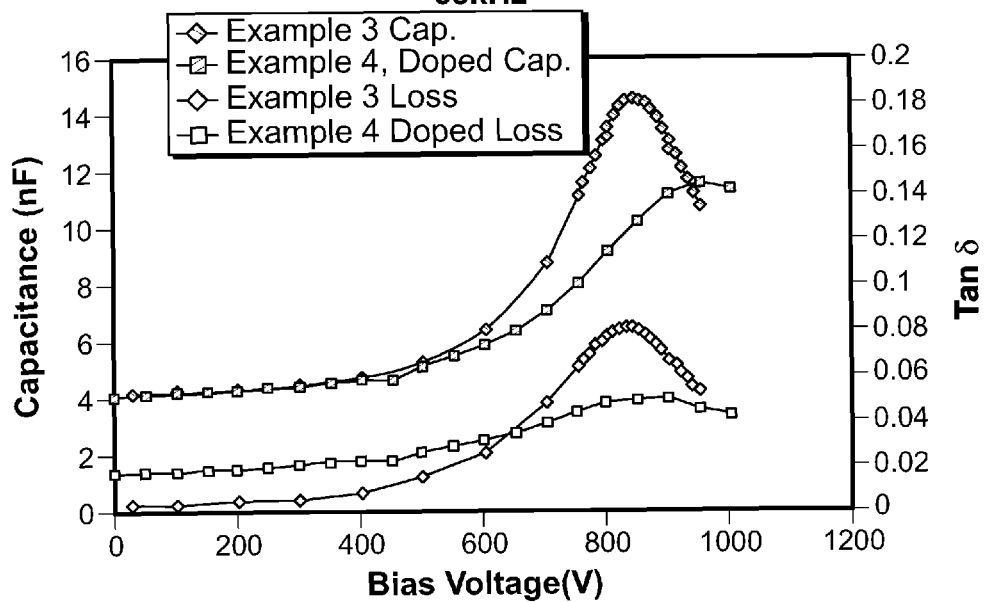
FIG. 10 illustrates an exemplary capacitance and loss vs. DC bias for capacitors produced according to Example 3 and Example 4.

According to an Example 4, a high energy density, low loss antiferroelectric material with losses further reduced by $MnO_2$ was produced by synthesizing a powder $(Pb_{0.885}La_{0.02}Sr_{0.08})(Sn_{0.37}Zr_{0.50}Ti_{0.13})_{0.9975}O_3$, Composition A, as described above and then adding about 0.1% of $MnO_2$ to the powder by ball milling for about 16 hrs. The powder was processed under the same conditions to produce the same type of multilayer capacitor described in the Example 3. The capacitor had about 4 nF zero field capacitance with about 0.0007 dielectric loss. FIG. 10 is a comparison of the capacitance and loss vs. DC bias voltage for the capacitors produced in Examples 3 and 4. Capacitors containing $MnO_2$ have much lower loss and can therefore handle much higher powers and ripple currents.

According to an Example 5, multilayer antiferroelectric ceramic capacitors were produced and compared that correspond to a standard capacitor, a high value, moderate voltage capacitor, and a high value, high voltage capacitor.

Figure 11A:
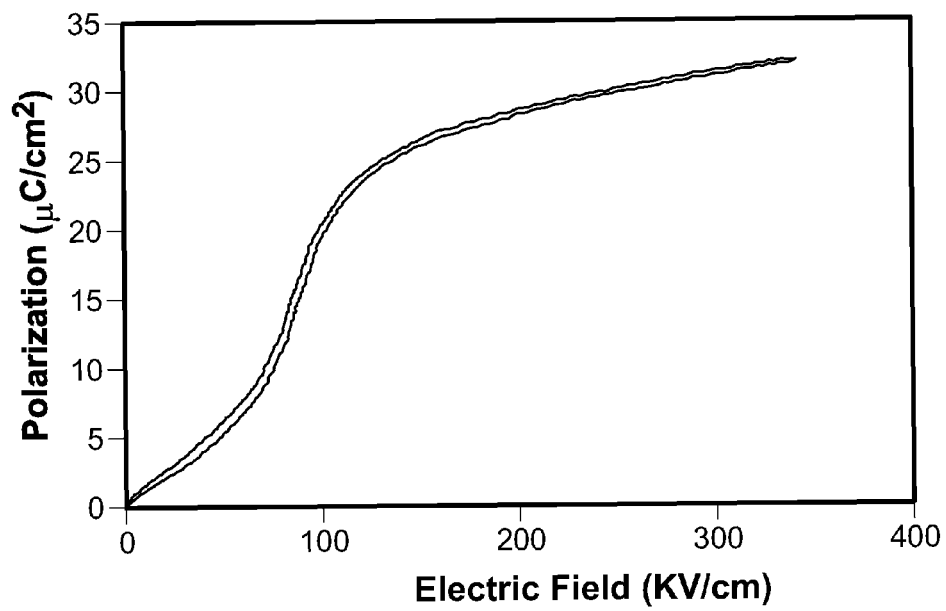
FIGS. 11A and 11B illustrate an exemplary polarization vs. electric field and energy density vs. electric field result, respectively, of a 30 active layer multilayer capacitor of Composition A.
Figure 11B:
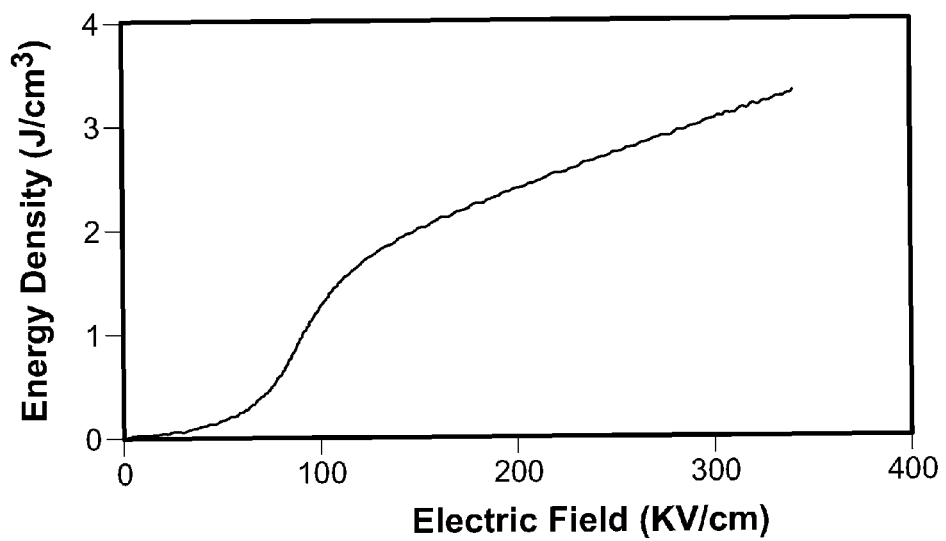

A standard capacitor was produced with a powder having a $(Pb_{0.885}La_{0.02}Sr_{0.08})(Sn_{0.37}Zr_{0.50}Ti_{0.13})_{0.9975}O_3$, powder composition synthesized as described above. Tape casting was conducted to produce ceramic tape with about 33 μm thickness. Pt ink was screen printed on thirty active layers for inside electrodes and five layers of non-printed sheets were used for top and bottom margins. Multilayer capacitors were fabricated in the same way as described in Example 1 above. The resulting multilayer capacitor has dimensions of about 8×9×1.2 mm and inside dimension of about 0.03 mm active layer thickness, about 52 mm² electrode area per layer, and about 1560 mm² total electrode area. The capacitor had about 420 nF zero field capacitance with about 0.003 dielectric loss. The polarization behavior and energy density of the multilayer capacitor produced under these conditions is shown in FIGS. 11A and 11B, respectively.

Figure 12:
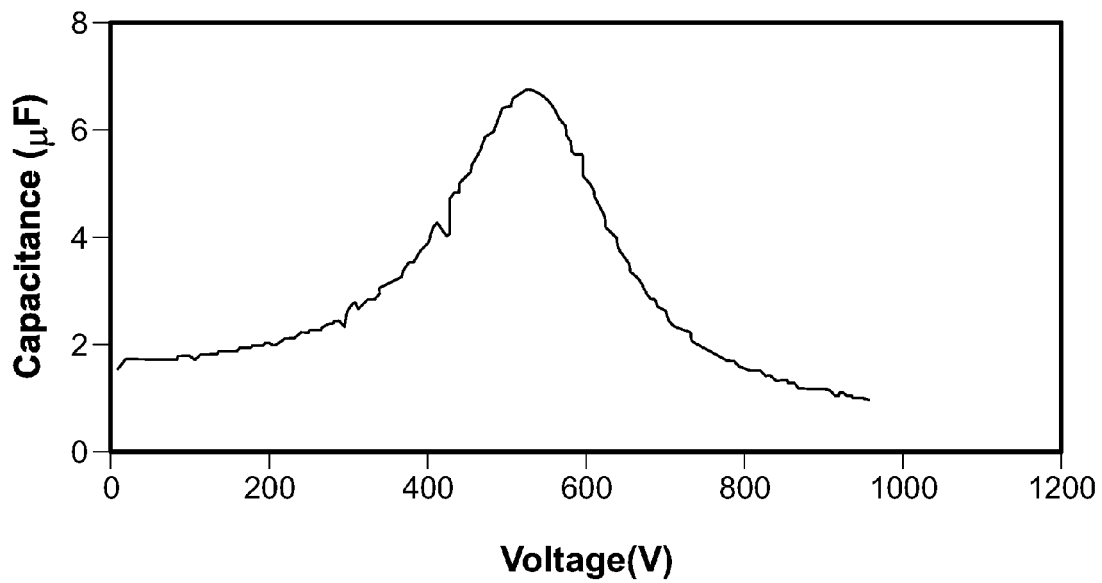
FIG. 12 illustrates an exemplary capacitance vs. voltage result of a 50 active layer capacitor of Composition A.

A high value, moderate voltage capacitor was produced with a powder having a $(Pb_{0.885}La_{0.02}Sr_{0.08})(Sn_{0.37}Zr_{0.50}Ti_{0.13})_{0.9975}O_3$, powder composition synthesized as described above. Tape casting was conducted to produce ceramic tape with about 33 μm thickness. Pt ink was screen printed on to fifty active layers for inside electrodes each active layer consisted of two sheets of tape and ten layers of non-printed sheets were used for top and bottom margins. The multilayer capacitors were fabricated in the same method described in Example 3. The resulting multilayer capacitor had dimensions of about 17×17×3.6 mm and inside dimension of about 0.06 mm active layer thickness, about 216 mm² electrode area per layer and about 10780 mm² total electrode area. The capacitor had about 1.45 μF zero field capacitance with about 0.003 dielectric loss and the maximum capacitance about 6.8 μF at about 523V. The capacitance of the multilayer capacitor as a function of applied voltage is shown in FIG. 12.

Figure 13:
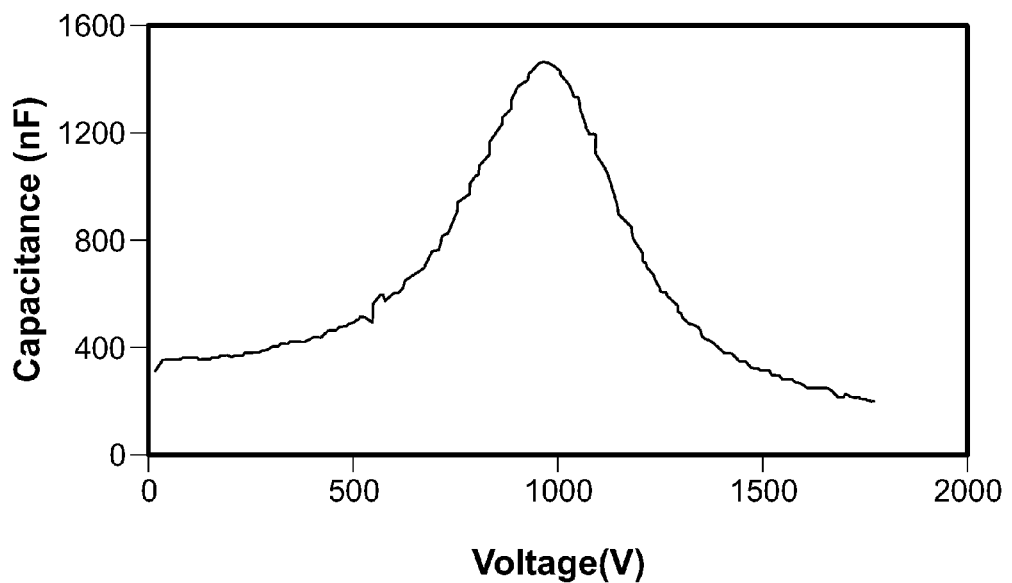
FIG. 13 illustrates an exemplary capacitance vs. voltage result of a 20 active layer multilayer capacitor of Composition A.

A high value, high voltage capacitor was produced with a powder having a $(Pb_{0.885}La_{0.02}Sr_{0.08})(Sn_{0.37}Zr_{0.50}Ti_{0.13})_{0.9975}O_3$, powder composition synthesized as described above. Tape casting was conducted to produce ceramic tape with about 33 μm thickness. Pt ink was screen printed on twenty active layers for inside electrodes each active layer consisting of four sheets of tape and twelve layers of non-printed sheets were used for top and bottom margins. The multilayer capacitors were fabricated in the same method described in Example 3. The resulting multilayer capacitor had dimensions of about 17×17×3.4 mm and inside dimension of about 0.11 mm active layer thickness, about 216 mm² electrode area per layer and about 4312 mm² total electrode area. The capacitor had about 0.88 μF zero field capacitance with about 0.003 dielectric loss and the maximum capacitance about 1.5 μF at about 1000V. The capacitance of the multilayer capacitor as a function of applied voltage is shown in FIG. 13.

Figure 14:
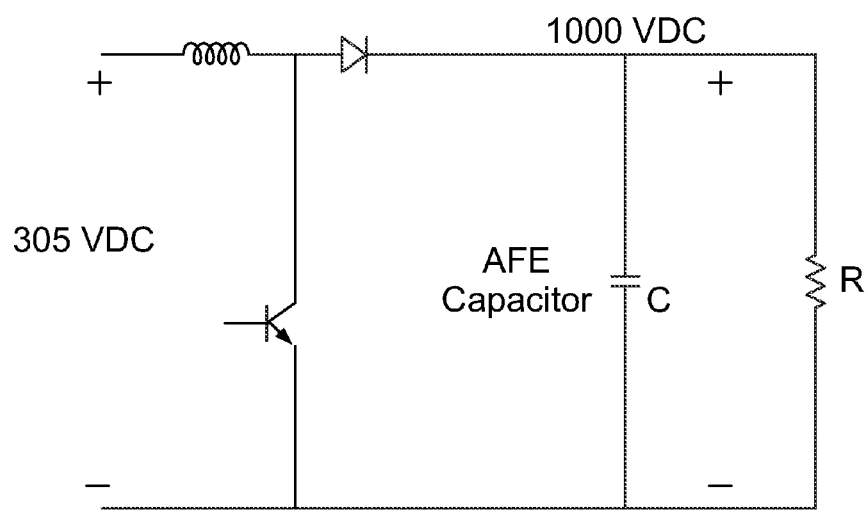
FIG. 14 illustrates an exemplary boost converter for testing ripple voltage and current handling capability.
Figure 15A:
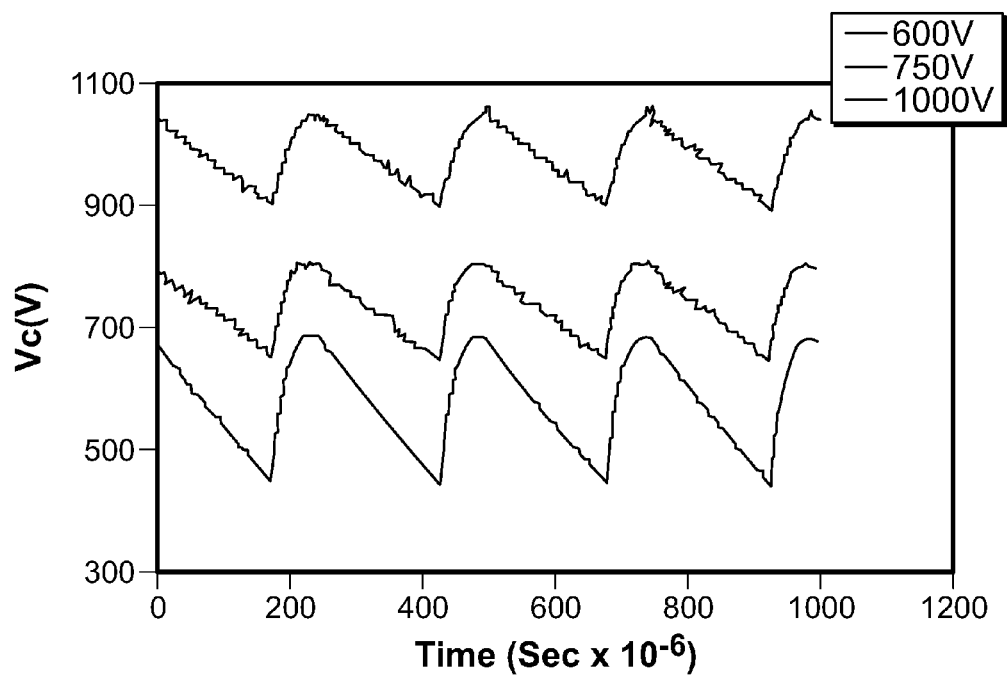
FIGS. 15A and 15B illustrate exemplary capacitor ripple voltage vs. Boost converter bus voltage and current vs. Boost converter bus voltage, respectively, for exemplary capacitors formed in accordance to Example 5.
Figure 15B:
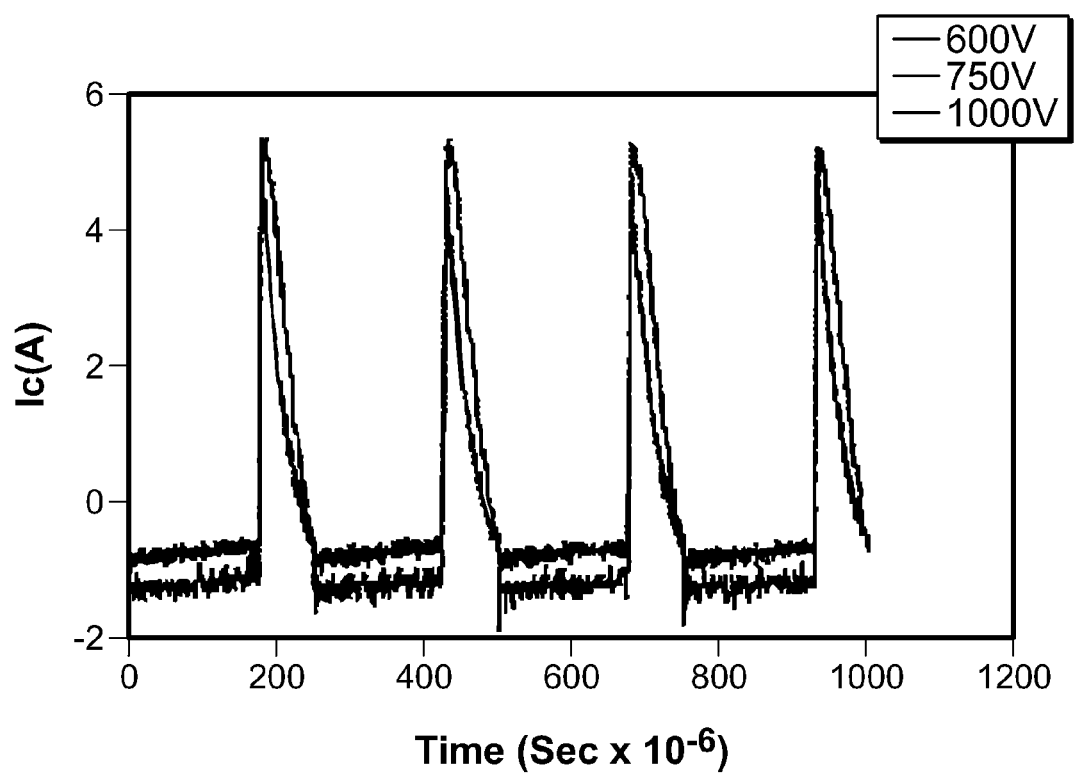

The high value, high voltage capacitors according to Example 5 were tested in a boost converter as shown in FIG. 14. The capacitor was placed across the converter's DC bus. A sinusoidally varying voltage was then applied around the DC bus voltage. The resulting voltage and current across the capacitor were measured. Capacitor temperature was also measured. The voltage and current ripple needed for the capacitor to self heat to 60° C. was arbitrarily set as the maximum safe operating conditions for the capacitor. The voltage and current waveforms required for a steady state capacitor temperature of 60° C. as a function of bias voltage is shown in FIGS. 15A and 15B, respectively. Voltage ripple decreases as bias voltage increases because capacitance is increasing due the nonlinear response of the antiferroelectric capacitance as a function of voltage. This verifies the basic premise for using an antiferroelectric capacitor in an AC power circuit: the capacitor becomes a more effective filter as the signal it is filtering increases because the material's dielectric constant is nonlinear in the electric field causing the capacitance to increase with voltage. The ripple current, as expected, changes much less with bias. The peak current values of 4.5 to 5.5 Amp are quite high for such a small capacitor. Allowing the capacitor to self heat to 100° C. resulted in a peak current of over 8 Amp. Since the capacitor has a very high maximum operating temperature of over 200° C., such high currents may be practically achieved.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A high energy density, antiferroelectric multilayer ceramic capacitor, comprising:
   at least one ceramic layer comprising a composition selected from the group consisting of:
   $Pb(Sn_x, Zr_y, Ti_z)O_3$ with x+y+z=100 mol % and x ranging from 0.1 to 80 mol %, y ranging from 0 to 99.9 mol %, and z ranging from 0 to 30 mol %; and
   $(Pb_{1-z}M_z)_{1-t}R_t(Sn, Zr, Ti)_{1-t/4}O_3$; and
   $(Pb_{1-z}M_z)_{1-t(3/2)}R_t(Sn, Zr, Ti)O_3$; and
   $C[(Pb_{1-z}M_z)_{1-t}R_t(Sn, Zr, Ti)_{1-t/4}O_3]+1-C[(Pb_{1-z}M_z)_{1-t(3/2)}R_t(Sn, Zr, Ti)O_3]$;
   with M being an ion with a 2+ valance selected from the group of elements consisting of Sr and Ba with z ranging from 0 to 20 mol % and the portions of Sn, Zr, and Ti varying over the ranges indicated in (1) above; with R being an ion with 3+ valance selected from the group of elements consisting of La, Ce, Pr, Nd, Pm, Sm, Eu, Gd, Tb, Dy, Ho, Er, Tm, Yb and Lu; t ranging from 0 to 10 mol %; and C ranging from 0 to 1; and
   a conductive electrode formed upon the at least one ceramic layer.

2. The capacitor of claim 1, wherein the conductive electrode is disposed between adjacent ceramic layers of the at least one ceramic layer.

3. The capacitor of claim 1, wherein the composition is: $(Pb_{0.885}La_{0.02}Sr_{0.08})(Sn_{0.37}Zr_{0.50}Ti_{0.13})_{0.9975}O_3$.

4. The capacitor of claim 3, further comprising about 0.1 wt % $MnO_2$.

5. The capacitor of claim 1, wherein the composition is: $Pb_{0.98}La_{0.02}(Sn_{0.55}Zr_{0.45})_{0.995}O_3$.

6. The capacitor of claim 5, further comprising about 0.1 wt % $MnO_2$.

7. An AC power circuit, comprising:
   a capacitor of claim 1.

8. A method of making a high energy density, antiferroelectric material for use in a high energy density, antiferroelectric multilayer ceramic capacitor, comprising:
   forming a powder mixture comprising:
      a raw material powder;
      a solvent; and
      pH adjusters;
      wherein the raw material powder comprises about stoichiometric proportions of oxides, carbonates, hydroxides or hydrated versions thereof to form the high energy density, antiferroelectric material
   mixing the powder mixture to form a slurry;
   drying the slurry to remove the solvent;
   heating the dried slurry to form a antiferroelectric material having a predominantly perovskite crystalline structure having a composition selected from the group consisting of:
   $Pb(Sn_x, Zr_y, Ti_z)O_3$ with x+y+z=100 mol % and x ranging from 0.1 to 80 mol %, y ranging from 0 to 99.9 mol %, and z ranging from 0 to 30 mol %; and
   $(Pb_{1-z}M_z)_{1-t}R_t(Sn, Zr, Ti)_{1-t/4}O_3$; and
   $(Pb_{1-z}M_z)_{1-t(3/2)}R_t(Sn, Zr, Ti)O_3$; and
   $C[(Pb_{1-z}M_z)_{1-t}R_t(Sn, Zr, Ti)_{1-t/4}O_3]+1-C[(Pb_{1-z}M_z)_{1-t(3/2)}R_t(Sn, Zr, Ti)O_3]$;
   with M being an ion with a 2+ valance selected from the group of elements consisting of Sr and Ba with z ranging from 0 to 20 mol % and the portions of Sn, Zr, and Ti varying over the ranges indicated in (1) above; with R being an ion with 3+ valance selected from the group of elements consisting of La, Ce, Pr, Nd, Pm, Sm, Eu, Gd, Tb, Dy, Ho, Er, Tm, Yb and Lu; t ranging from 0 to 10 mol %; and C ranging from 0 to 1.

9. The method of claim 8, wherein the solvent is water or an organic solvent.

10. The method of claim 8, wherein the composition comprises:
   $(Pb_{0.885}La_{0.02}Sr_{0.08})(Sn_{0.37}Zr_{0.50}Ti_{0.13})_{0.9975}O_3$.

11. The method of claim 10, wherein the composition further comprises 0.1 wt % $MnO_2$.

12. The material of claim 8, wherein the composition comprises:
   $Pb_{0.98}La_{0.02}(Sn_{0.55}Zr_{0.45})_{0.995}O_3$.

13. The method of claim 12, wherein the composition further comprises 0.1 wt % $MnO_2$.

14. The method of claim 8, wherein the raw material powders are between about 0.1 um and about 1 um and the heating is performed at between about 700° C. to about 1100° C.

15. The method of claim 8, further comprising:
   forming the antiferroelectric material into a capacitor.

* * * * *